United States Patent
Lerousseau et al.

(10) Patent No.: US 12,511,747 B2
(45) Date of Patent: Dec. 30, 2025

(54) METHOD FOR TRAINING A DECISION SYSTEM FOR SEGMENTING MEDICAL IMAGES

(71) Applicants: INSTITUT GUSTAVE ROUSSY, Villejuif (FR); UNIVERSITE PARIS-SACLAY, Gif-sur-Yvette (FR); CENTRALESUPELEC, Gif sur Yvette (FR)

(72) Inventors: Marvin Lerousseau, Arcueil (FR); Eric Deutsch, Paris (FR)

(73) Assignees: INSTITUT GUSTAVE ROUSSY, Villejuif (FR); UNIVERSITE PARIS-SACLAY, Gif-sur-Yvette (FR); CENTRALE SUPELEC, Gif-sur-yvette (FR)

( * ) Notice: Subject to any disclaimer, the term of this patent is extended or adjusted under 35 U.S.C. 154(b) by 351 days.

(21) Appl. No.: 18/550,020

(22) PCT Filed: Mar. 11, 2022

(86) PCT No.: PCT/EP2022/056387
§ 371 (c)(1),
(2) Date: Sep. 11, 2023

(87) PCT Pub. No.: WO2022/189653
PCT Pub. Date: Sep. 15, 2022

(65) Prior Publication Data
US 2024/0153085 A1   May 9, 2024

(30) Foreign Application Priority Data
Mar. 11, 2021  (EP) ..................... 21305300

(51) Int. Cl.
*G06V 10/00*  (2022.01)
*G06T 7/00*   (2017.01)
*G16H 30/40*  (2018.01)

(52) U.S. Cl.
CPC .......... *G06T 7/0012* (2013.01); *G16H 30/40* (2018.01); *G06T 2207/20084* (2013.01)

(58) Field of Classification Search
CPC ............ G06N 3/02; G06N 3/08; G06N 3/042; G06N 3/045; G06N 3/047; G06N 3/082;
(Continued)

(56) References Cited

U.S. PATENT DOCUMENTS

| 11,263,749 B1* | 3/2022 | Purushottam .......... G16H 30/20 |
| 11,615,508 B2* | 3/2023 | Vera-Gonzalez ... G06F 3/04847 382/156 |

(Continued)

OTHER PUBLICATIONS

International Search Report issued on Jun. 13, 2022, in corresponding International Application No. PCT/EP2022/056387, 3 pages.
(Continued)

*Primary Examiner* — Amir Alavi
(74) *Attorney, Agent, or Firm* — Maier & Maier, PLLC

(57) ABSTRACT

A method implemented by computer means for training a decision system for segmenting medical images from a training set of annotated medical images, the segments belonging to at least one class, each annotation of the medical images including quantitative information about a number of pixels of the image that belongs to each of the classes, the method using weakly-supervised algorithm based on a percentage of the pixels of the image belonging to a concerned class.

9 Claims, 4 Drawing Sheets

(58) Field of Classification Search
CPC ...... G06N 3/088; G06N 3/092; G06N 3/0454; G06N 3/0475; G06N 3/0464; G06N 20/00; G06N 20/10; G06N 20/20; G16H 30/40; G06T 7/0012; G06T 2207/20081; G06T 2207/20084

See application file for complete search history.

(56) References Cited

U.S. PATENT DOCUMENTS

| | | | | |
|---|---|---|---|---|
| 11,776,117 | B2* | 10/2023 | Guendel | G16H 30/40 |
| | | | | 382/132 |
| 11,797,647 | B2* | 10/2023 | Laserson | G16H 30/40 |
| 11,842,485 | B2* | 12/2023 | Tan | G06N 3/045 |
| 12,165,761 | B2* | 12/2024 | Senegas | G16H 50/20 |
| 12,236,592 | B2* | 2/2025 | Islam | G16H 50/20 |
| 12,400,332 | B2* | 8/2025 | Wei | G06T 7/33 |
| 12,412,282 | B2* | 9/2025 | Amadou | G06T 7/246 |
| 2020/0161005 | A1* | 5/2020 | Lyman | G16H 50/20 |
| 2024/0153085 | A1* | 5/2024 | Lerousseau | G06N 3/08 |
| 2024/0428421 | A1* | 12/2024 | Shriram | G06T 7/12 |

OTHER PUBLICATIONS

Dong Jiahua et al.; "Semantic-Transferable Weakly-Supervised Endoscopic Lesions Segmentation", 2019 IDDD/CVF International Conference on Computer Vision (ICCV), IEEE, Oct. 27, 2019, pp. 10711-10720, XP0337323299, 10 pages.

Iqbal Javed et al.; "MLSL: Multi-Level Self-Supervised Learning for Domain Adaptation with Spatially Independent and Semantically Consistent Labeling", 2020 IEEE Winter Conference on Application of Computer Vision (WACV), IEEE, Mar. 1, 2020, pp. 1853-1862, XP033771273.

Lerousseau, et al., "Weakly supervised multiple instance learning histopathological tumor segmentation", arXiv:2004.05024v3 [eess.IV]; Jul. 9, 2020; 10 pages.

* cited by examiner

METHOD FOR TRAINING A DECISION SYSTEM FOR SEGMENTING MEDICAL IMAGES

FIELD

The present invention relates to a method for training a decision system for segmenting medical images or detecting objects on medical image, particularly adapted for histopathological microscopic images.

In digital image processing and computer vision, image segmentation is a method aiming at partitioning a digital image into multiple segments or sets of pixels. More precisely, image segmentation is the process of assigning a label, also referred to as annotation or class, to every pixel in an image such that pixels with the same label share certain characteristics. The result of image segmentation is a set of segments that collectively cover the entire image, also called segmentation map, or a set of contours extracted from the image.

Machine learning techniques, and in particular deep learning algorithms, have been successfully used for image segmentation in digital images. However, such techniques are generally based on supervised learning, where a decision system or model is trained based on a labelled training dataset. Once trained, the model is used to segment a new unseen image, i.e. to assign a label to each pixel of said new image.

BACKGROUND

In general, each pixel of each image of the training set is annotated by a human to assign to said pixel at least one label, called ground-truth label. In the case of medical images, such annotation work has to be provided by a medical expert, i.e., a physician specialized in the concerned medical field. The performance of the trained model is notably dependent on the number of annotated images in the training dataset.

However, it is extremely expensive to have specialized physicians annotating each pixel of a significant number of images. Such task can take several hours to complete for a single image.

Another option is to use unsupervised algorithms, where a model can be trained without the need of labelled data. In practice, such algorithms have shown limited performance while supervised learning has achieved state-of-art performance in various computer-vision tasks.

The document "Marvin Lerousseau, Maria Vakalopoulou, Marion Classe, Julien Adam, Enzo Battistella, Alexandre Carré Théo Estienne, Théophraste Henry, Eric Deutsch and Nikos Paragios, Weakly supervised multiple instance learning histopathological tumor segmentation, arXiv: 2004.05024v3 [eess.IV] 9 Jul. 2020" discloses the use of Multiple Instance Learning (MIL) algorithms for the segmentation of histopathological images.

MIL algorithms provide a solution to deal with the expensive labelling of data in supervised learning. In comparison with fully-labelled supervised learning algorithms where every training data or instance is assigned with a ground-truth label, MIL algorithms group the instances into labelled bags, without the need that all the instances of each bag have individual labels. For example, in a binary classification case, a bag is labelled positive if it has at least one positive instance or is labelled negative if all its instances are negative. In the above-mentioned document, each image is divided into sub-images, each image being considered as a bag and sub-images being considered as instances.

The present invention aims to propose a training method for training a decision system having good performance on segmentation tasks for medical images, without the need of labelling each pixel of the images of the training set.

To that end, the invention proposes a method implemented by computer means for training a decision system for segmenting medical images from a training set of annotated medical images, said segments belonging to at least one class, each annotation of said medical images including quantitative information about a number of pixels of the image that belongs to each of said classes, said method comprising, for at least a part of the images of the training set, the following iterative steps:

SUMMARY (a) dividing an image of said part of the training set into a set of sub-images or deriving features from said image, so as to obtain image instances,
(b) predicting, using the decision system, for each pixel of at least part of said sub-images or for each image feature, the probability that said pixel or said feature belongs to each of the above classes, the prediction from the decision system being in the form of a prediction tensor,
(c) calculating, from the prediction tensor, a pseudo ground-truth tensor using a pseudo ground-truth generator, said pseudo ground-truth generator assigning, for each instance and for each of said classes, a single probability value to at least part of the pixels or features having the highest probability of belonging to the concerned class, the number of pixels to which the high probability value is assigned being dependent on said quantitative information of the annotation,
(d) calculating, for each instance, the result of a cost function based on the prediction tensor and the pseudo ground-truth tensor,
(e) updating the parameters of the decision system based on the result of the cost function, said method further comprising a final step of outputting a pre-trained model with updated parameters.

The method according to the invention thus makes it possible to train a decision system based on simple annotations, requiring a short annotation time. Such method reduces the cost of the image annotation step, while offering satisfactory performance compared with a training method using pixelwise or coarsely defined segmentation annotations, for which each pixel or each group of pixels of each image of the training set is annotated.

The decision system can also be referred to as a model, inference model, or transfer function.

Image features may be obtained during a feature extraction step. Such features may be computed with:
mathematical functions such as the average function or the standard deviation function,
edge, corner, blob, or ridge detectors which can output a feature map from an input image,
a neural network, frozen or not frozen, which may output a tensor, or a vector, or a value, such as feed forward neural networks, convolutional neural networks or recurrent neural networks, and/or
estimates obtained with pre-defined bags of words.

Such decision system may also be used for detecting at least one object on a medical image, for example an object belonging to at least one of said classes.

If the number of sub-images is defined by l, the number of pixels or features by m, and the number of classes by n, then the prediction tensor and the pseudo ground-truth tensor each have a dimension for each image equal to l×m×n.

The number of classes may be equal or greater than 2.

Each label contains n values concerning the quantity of pixels or features of the image that belongs to the concerned class, said value being for example expressed as a percentage or as the proportion within the image, or as a number indicating an absolute value.

The image instances may refer to the sub-images of said image or to the image features of said image.

A tensor may be defined by an algebraic object that describes a relationship between sets of algebraic objects, such as vectors or numbers. Such tensor may refer to l×m×n numbers and their relationship.

In particular, the numbers of the prediction tensor may be numbers between 0 and 1, illustrating the probability of the concerned pixel to belong to the concerned class. A high probability may be a number close to 1 and a low probability may be a number close to 0.

The numbers of the pseudo ground-truth tensor may be numbers equal to the above-mentioned single probability value.

Each tensor may be formed by at least one vector or matrix, or numbers, and/or by relationship between these elements. A tensor may also be a set of numbers, stored for example in a memory, and describing the above-mentioned probabilities of said pixels or said features to belong to the concerned classes.

The above-mentioned iterative step can be applied to all the images of the training set or to only part of said images, chosen randomly or according to a specific rule.

Step (c) may consists in calculating, from the prediction tensor, a pseudo ground-truth tensor using a pseudo ground-truth generator, said pseudo ground-truth generator assigning, for each instance and for each of said classes, a single high probability value to at least part of the pixels or features having the highest probability of belonging to the concerned class and a single low probability value to at least part of the other pixels or features, the number of pixels to which the high probability value is assigned being dependent on said quantitative information of the annotation.

The single high value may be a probability value equal to 1, the single low value being a probability value equal to 0. In this case, the pseudo ground-truth tensor does not contain numbers different from 0 and 1.

Alternatively, the single high value may be a probability value equal to $1-\alpha$, the single low value being a probability value equal to $0+\alpha$, and a may be comprised between 0 and 0.2, for example equal to 0.1. In other words, in the case where $\alpha=0.1$, the single high value may be a probability value equal to 0.9, the single low value being a probability value equal to 0.1.

In the context of quantitative label represented as a percentage, denoting $p \in [0,100\%]$ the label of each image, the pixels having the p % highest values of probability computed by the decision system may be selected, and may be assigned a ground-truth value of 1, while the pixels having 100-p % lowest values of probability computed by the decision system are assigned a ground-truth of 0. One way to select the p % highest values and the 100-p % lowest values may be to first compute the $p^{th}$ percentile of the probabilities distribution. Then, the p % highest probabilities are sampled as the ones whose values is greater than, or greater or equal than the 100-$p^{th}$ percentile. Symmetrically, the 100-p % lowest values are the ones that are lower than, or lower or equal than the 100-$p^{th}$ percentile.

Thus, the quantitative information may be a percentage p comprised between 0 and 100%, and the single high probability value, for example 1, may be assigned to the pixels having the p % highest values of probability computed by the decision system, and the single low probability value, for example 0, may be assigned to the pixels having the 100-p % lowest values of probability computed by the decision system.

The $p^{th}$ percentile of the probabilities distribution may be computed and the p % highest probabilities may be sampled as the ones whose values is greater than, or greater or equal than the 100-$p^{th}$ percentile, the 100-p % lowest probabilities being the probabilities that are lower than, or lower or equal than the 100-$p^{th}$ percentile.

If the quantitative label is not a percentage but an absolute value denoted a, the a values of the highest probabilities computed by the decision system may be selected and assigned a value of 1, while the other values of probability computed by the decision system may be assigned a value of 0. The medical images may be histopathological microscopic images.

Alternatively, the method according to the invention may be applied to other types of medical images (radiological images, MRI, . . . ).

Each histopathological microscopic image may be a whole slide image with any type of staining such as H&E or immunohistochemistry stains, cytopathological images, immunofluorescence images, or any image extracting from such microscopic images.

Each image of the training set may be randomly divided into a set of sub-images.

The dimensions of the sub-images of said image may vary or may be constant.

In the case where all the sub-image have the same dimensions, said sub-images may be referred to as tiles.

Medical images may be two dimensional images. In alternative, medical images may be three dimensional images. In this case, the pixels may be referred to as voxels.

The sampling of said image into sub-images may be performed randomly throughout the image in accordance with a pre-configured number of sampled instances.

As an alternative, the sub-images can be evenly-spaced selected.

Sub-images may be selected through a pre-defined sampling pattern, such as a grid or a locally random grid.

Alternatively, the set of sub-images only contains one sub-image. In this case, the entirety of the image can be selected as the sub-image.

A mask may be applied to at least one image of the training set, discarding a part of said image from being divided into sub-images.

For instance, a mask can be applied to selectively discard the background of the image such as not to sample background instances.

The decision system may implement non-linear decisions algorithms, such as neural networks, including convolutional neural network or transformer-based algorithm.

The decision system may comprise a set of decision algorithms.

Non-linear decision algorithms may be used as features extractors, the probabilities that said pixel belongs to each of the above-mentioned classes being computed by using linear decision systems of other type of machine learning algorithm, such as ensemble methods, for example random forests, or logistic regression.

The invention also relates to a computer software, comprising instructions to implement at least a part of the method according to any of the preceding claims when the software is executed by a processor.

The invention also related to a computer device comprising:
- an input interface to receive a training set of annotated medical images,
- a memory for storing at least instructions of a computer program according to preceding claims,
- a processor accessing to the memory for reading the aforesaid instructions and executing the method according to the invention,
- an output interface to provide the pre-trained model with updated parameters.

The invention also relates to a computer-readable non-transient recording medium on which a computer software is registered to implement the method according to the invention, when the computer software is executed by a processor.

BRIEF DESCRIPTION OF THE FIGURES

Other features, details and advantages will be shown in the following detailed description and on the figures, on which.

DETAILED DESCRIPTION

Figure 1:
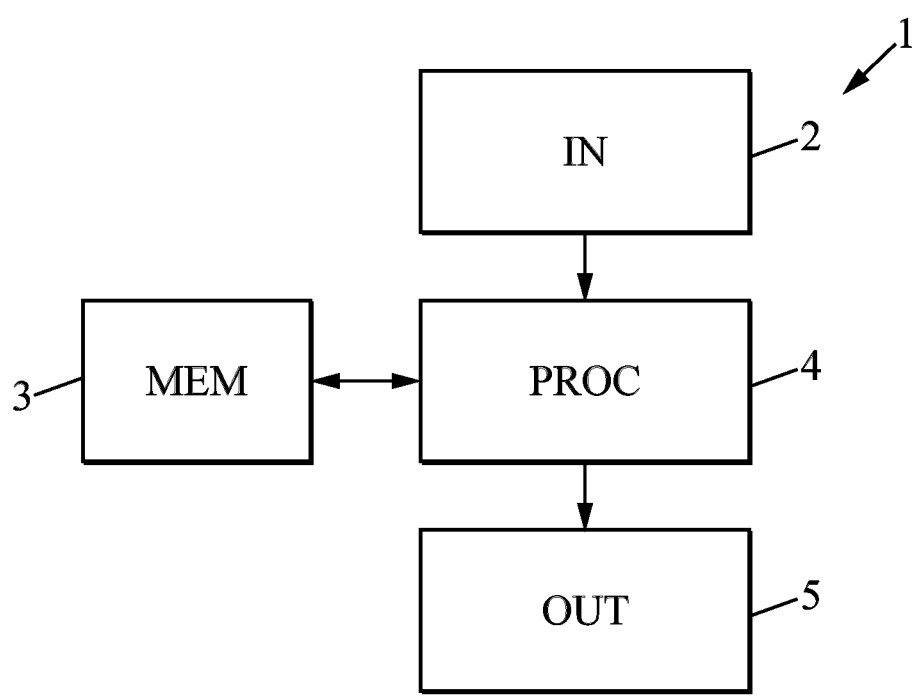
FIG. 1 shows schematically an example of a computer device according to the invention.

FIG. 1 schematically shows an example of a computer device 1 according to the invention. Said computer device 1 comprises:
- an input interface 2,
- a memory 3 for storing at least instructions of a computer program,
- a processor 4 accessing to the memory 3 for reading the aforesaid instructions and executing the method according to the invention,
- an output interface 5.

Figure 2:
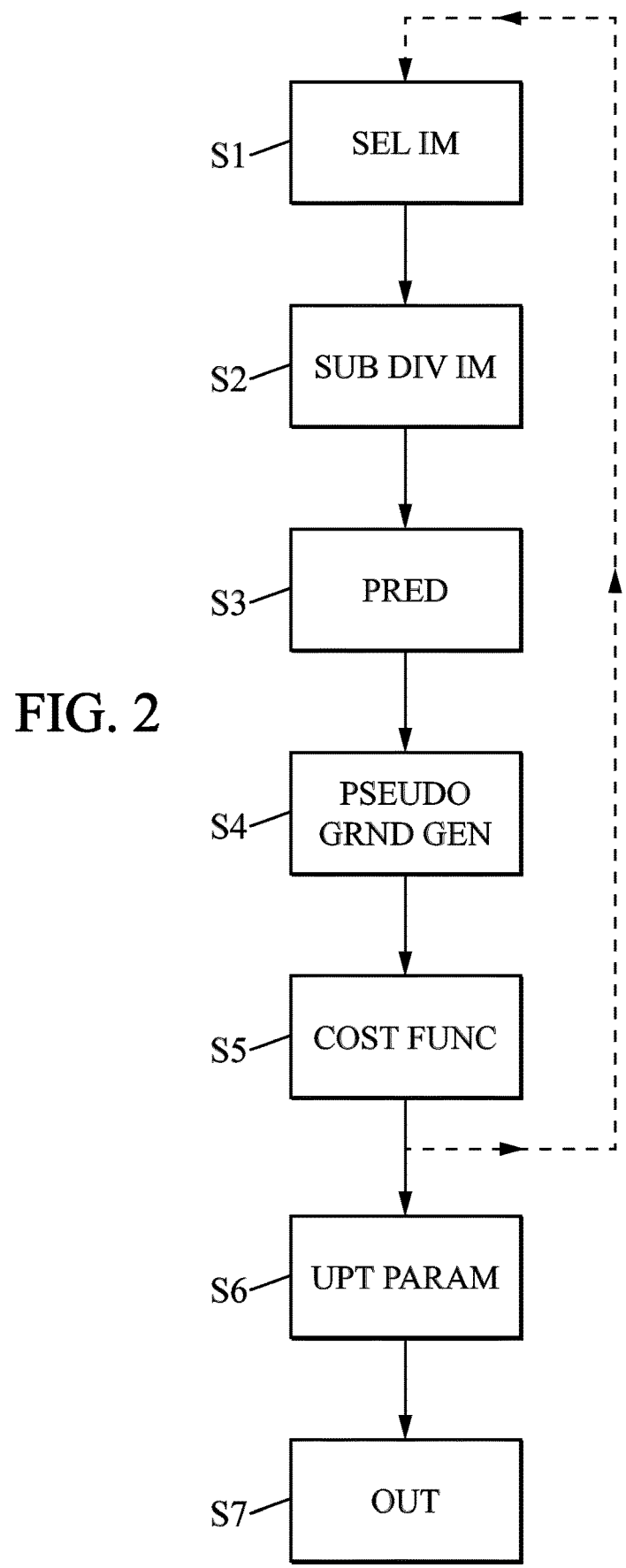
FIG. 2 shows schematically the steps of the method according to the invention.

FIG. 2 schematically shows the steps of a training method according to the invention, executed by the computer device.

Figure 4:
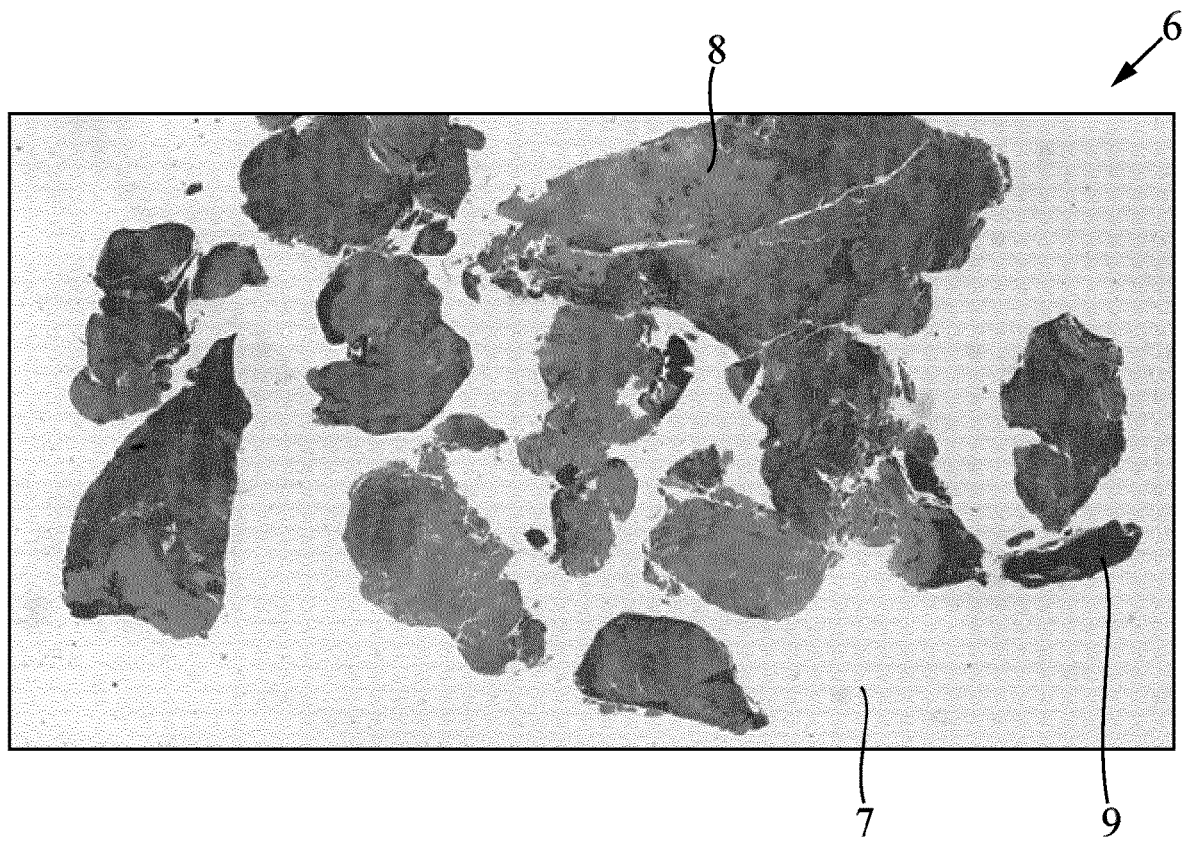
FIG. 4 shows an example of histopathological image.

In a first step S1, an image from a training set is selected. Said training set is obtained through the input interface 2. The training set comprises labelled medical images. Each image may be a histopathological microscopic image, for example a whole slide image with any type of staining such as H&E or immunohistochemistry stains, cytopathological images, immunofluorescence images, or any image extracting from such microscopic images. An example of such image 6 is shown in FIG. 4. On this image 6, the white pixels 7 represents the background while other pixels illustrate tissue 8, where some part of this tissue comprises tumoural tissue 9.

Medical images may be two dimensional images. In alternative, medical images may be three dimensional images. In this case, the pixels may be referred to as voxels.

Each image is associated with a label or annotation comprising quantitative information about the number of pixels of the image that belong, for each of labelled classes. Said information may be expressed as a percentage or to the proportion within the image, or as a number indicating an absolute value.

Classes may indicate the presence or not of an apparent tumoural tissue for the concerned pixels. For example, a label value of 0.6 for the class "tumour" may indicate that 60% percent of the pixels represents tumour tissue on that image. As mentioned before, such label may be given by a specialized physician and considered as a ground-truth label. Other label value may concern other classes, for example classes associated to necrotic tissue or healthy tissue. In the case of percentage, the sum of the label value may or not be equal to 1, i.e. equal to 100%.

In a second step S2, the selected image is divided into sub-images, called instances. The dimensions of the sub-images of said image may vary or may be constant. In the case where all the sub-images have the same dimensions, said sub-images may be referred to as tiles.

Each image of the training set may be randomly divided into a set of sub-images. In particular, the sampling of said image into sub-images may be performed randomly throughout the image in accordance with a pre-configured number of sampled instances.

As an alternative, the sub-images can be evenly-spaced selected.

Sub-images may be selected through a pre-defined sampling pattern, such as a grid or a locally random grid.

Alternatively, the set of sub-images only contains one sub-image. In this case, the entirety of the image can be selected as the sub-image.

A mask may be applied to at least one image of the training set, discarding a part of said image from being divided into sub-images. For instance, a mask can be applied to selectively discard the background of the image in order to avoid sampling background instances.

In a third step S3, the processor computes a prediction, using a decision system, for each pixel of at least part of said sub-images or instances, the probability that said pixel or said feature belongs to each of the above classes, the prediction from the decision system being in the form of a prediction tensor.

The decision system can also be referred to as a model, inference model, or transfer function.

If the number of sub-images is defined by l, the number of pixels or features by m, and the number of classes by n, then the prediction tensor has a dimension for each image equal to l×m×n.

The decision system may implement non-linear decisions algorithms, such as neural networks, including convolutional neural network or transformer-based algorithm.

Non-linear decision algorithms may be used as features extractors, the probabilities that said pixel belongs to each of the above-mentioned classes being computed by using linear decision systems of other type of machine learning algorithm, such as ensemble methods, for example random forests, or logistic regression.

The prediction tensor may be stored into the memory.

The decision system comprises parameters that may be stored into the memory. These parameters may comprise the weights, also called synaptic weights, in the case of a neural network for example. Each type of algorithm may comprise specific parameters depending on the architecture of the decision system.

In a fourth step S4, the processor computes, from the prediction tensor, a pseudo ground-truth tensor using a pseudo ground-truth generator. The pseudo ground-truth generator assigns, for each instance and for each of said classes, a single high probability value to at least part of the pixels or features having the highest probability of belonging to the concerned class and a single low probability value to at least part of the other pixels or features. The number of pixels to which the high and low probability values are assigned are dependent on the quantitative information (e.g. percentage) of the label for the corresponding class.

The pseudo ground-truth tensor also has a dimension for each image equal to lxmxn.

Figure 3:
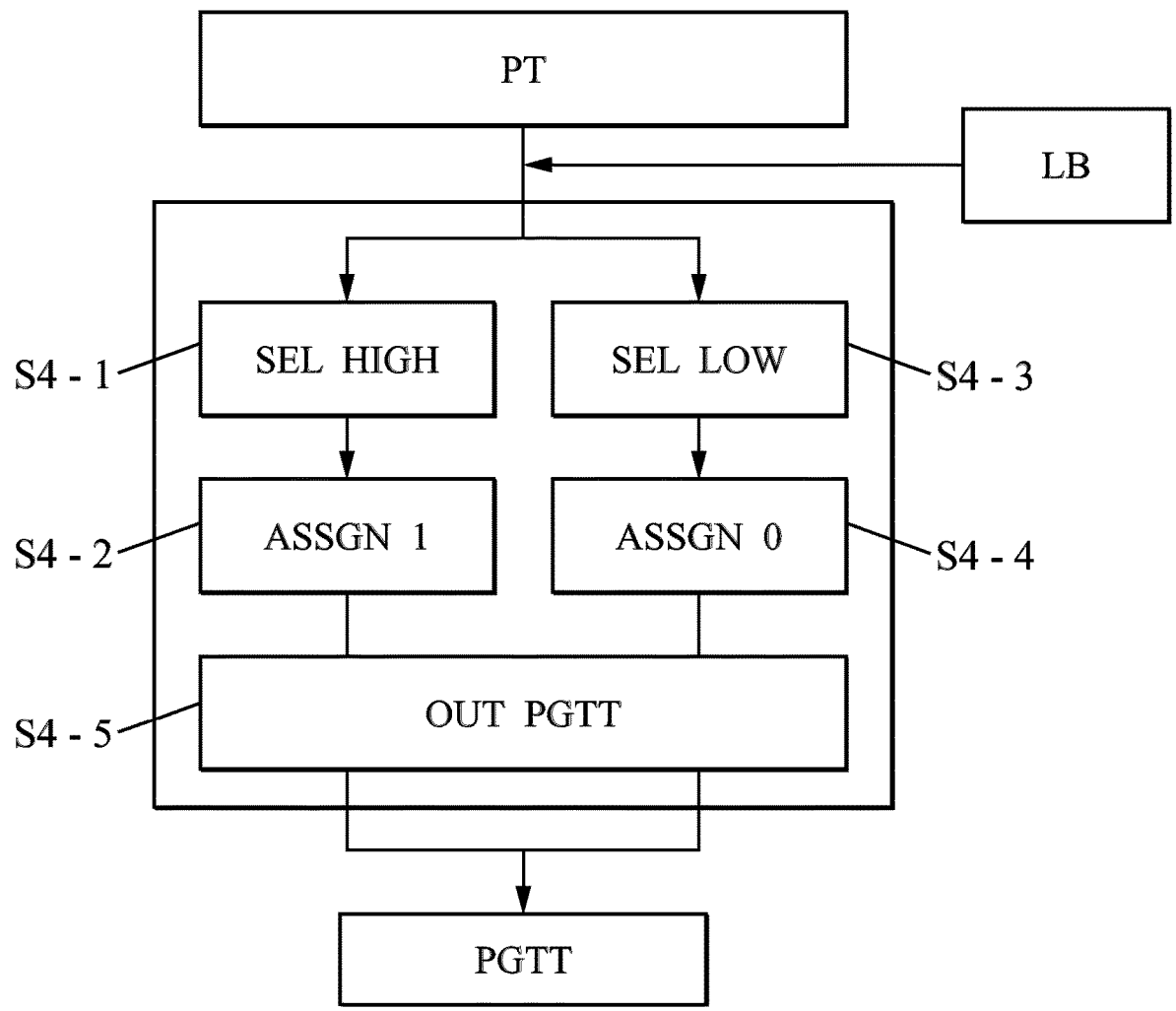
FIG. 3 shows schematically the computing steps of the pseudo ground-truth generator.

FIG. 3 illustrates the pseudo ground-truth generator process.

In a first embodiment, the task is binary and the decision system produces a prediction tensor where the number n of predicted classes is equal to 1, for example the class concerning the presence of a tumour. In this case, each pixel of each sub-image will be assigned a probability that this pixel illustrates the presence of a tumour, this probability being between 0 and 100% or between 0 and 1.

The pseudo ground-truth generator takes as input the prediction tensor PT and the label LB of the corresponding image, i.e. the quantitative information (for instance the percentage p) concerning the number of pixels of said image that belongs to said class. The value of p is a percentage between 0 and 100%.

The pseudo ground-truth generator selects, from the input tensor PT, the pixels of each instance having the p % highest values of probability computed by the decision system (step S4-1). These pixels may be assigned a pseudo ground-truth probability value of 1 instead of the original value of probability computed by the decision system (step S4-2).

The pseudo ground-truth generator also selects the pixels of each instance having the 100–p % lowest values of probability computed by the decision system (step S4-3). These pixels may be assigned a pseudo ground-truth probability value of 0 instead of the original value of probability computed by the decision system (step S4-4).

One way to select the p % highest values and the 100–p % lowest values may be to first compute the loth percentile of the probabilities distribution. Then, the p % highest probabilities are sampled as the ones whose values is greater than, or greater or equal than the $100-p^{th}$ percentile. Symmetrically, the 100–p % lowest values are the ones that are lower than, or lower or equal than the $100-p^{th}$ percentile.

If the quantitative label is not a percentage but an absolute value denoted a, the a values of probability computed by the decision system are selected and assigned a value of 1, while the other values of probability computed by the decision system are assigned a value of 0.

The pseudo ground-truth generator then builds and outputs a pseudo ground-truth tensor PGTT similar to the prediction tensor PT, where the original predicted values probability are replaced by the above-mentioned corresponding values of 0 and 1 (step S4-5).

Optionally, the ground-truth vector can be reconstructed by matching the indexes of outputs and the assigned ground-truth values. In such optional step, the pseudo-ground truth generator may reconstructs a ground-truth tensor that is the same size as the input tensor; i.e. the prediction and pseudo-ground truth tensors are of the same dimension and have values that are pixel wise associated.

For instance, for an input microscopic image with provided quantitative label of 40%, 40% of the outputs with highest values are assigned a value of 1 for error computation for a set of input instances extracted from the input microscopic image, while the 60% remainder of instances outputs are assigned a value of 0. In other words, in such case, all pixels of 40% of the sub-images may be assigned the probability of 1, and the pixels of the other sub-images may be assigned the probability of 0.

In a more general embodiment, the number n of predicted classes may be greater than 1. In this context, the label of the corresponding image is a vector or a set of n values. Each value may represent the percentage of pixels of said image that belong to the corresponding class.

In such multi-class embodiments, the pseudo ground-truth generator works as follows. Each class is processed successively. The first class applies the same approach as described above with its associated quantitative label, where the pixels with the p % highest values of probability are assigned a probability value of 1, the other pixels being assigned a probability value of 0.

Then, the next class is selected and the same process is applied only to the instances that have not been assigned a value of 1 for the previous class. In other words, instances whose outputs have been assigned to 1 in the previous step are masked off, and the same method is applied for the remainder of outputs with the quantitative label of the considered class. This is performed successively for all subsequent classes. In an embodiment, the successive sampling of such classes is performed in accordance with pre-defined sampling pattern. In another embodiment, these classes are randomly sampled. This random sampling can be constant for a plurality of training samples, or can be random for each training sample.

For any of the previous embodiments, the pseudo ground-truth generator may assign a value to only subset of the pixels of the corresponding sub-image, rather than to the entirety of said pixels of the sub-image. In this case, only a subset of said pixels can be assigned a value, while the remainder pixels are not assigned any pseudo ground-truth value. These pixels and their corresponding decision system outputs are masked in the next step when computing a loss or cost function and are thus not used to update the parameters of the decision system as described below. The percentage of pixels to be discarded can be pre-defined, or randomly sampled for each training image or for a plurality of training image.

Also, the percentages of discarded pixels may differ from both the group assigned with a pseudo ground-truth probability value of 0 and the group assigned with a pseudo ground-truth probability value of 1.

For instance, for a training image with 60% of positive pixels, the 55% of pixels with the highest probability values computed by the decision system can be assigned a value of 1, while only 35% of pixels with the lowest values computed by the decision system can be assigned a value of 0, essentially discarding 10% of pixels from the cost function computation. This margin of non-attribution can be absolute as a percentage, or relative, or a mixture of both, symmetrically or not for high and low values, and can also be negative or positive.

In a fifth step S5, for each instance or sub-image, the processor computes the result of a cost function based on the prediction tensor and the pseudo ground-truth tensor. Many different types of cost functions can be computed, as it is well known by the skilled in the art.

In a sixth step S6, for each instance or sub-image, the parameters of the decision system are updated based on the result of the cost function. Again, many different types of such update algorithm or optimizer can be computed at this step, as it is well known by the skilled in the art.

The above-described steps may be repeated for each image of the training set.

In a seventh step S7, a trained decision system is then outputted by the output interface 5.

A specific example of implementation of such method is described below.

In this example, such method has been applied on the task of automatic detection, delineation and segmentation of tumour tissue in whole slide images. 6481 snap-frozen whole slides images were downloaded from The Cancer Genome Atlas (TCGA).

Each image was priorly digitized from a hematoxylin-andeosin stained glass slide originating from one of the three locations: kidney, breast, and bronchus and lung. All whole slides images are publicly and freely available.

Each slide image was divided into overlapping sub-images or tile of size 512 pixels at a magnification of 20× with an overlap of 128 pixels on both four sides of each sub-image. Tiles representing essentially background (i.e. with few tissue material) were further removed. These were detected if at least 95% of their pixels have both red, green, and blue channels above a value of 200, where 0 represents black, and 255 represents white.

Additionally, a visual approximation of the percentage of tumour tissue, relative to the whole tissue extent, was computed by pathologists on TCGA. For instance, a slide with no apparent tumour tissue was assigned a percentage of 0%, a slide with only tumour tissue was assigned a percentage of 100%, and a whole slide image with half tumour tissue and half non tumour tissue was assigned a percentage of 50%. These labels are publicly and freely available in TOGA, denoted by the identifier "percent_tumour_cells".

Then, a Resnet50 model was instantiated from a snapshot pre-trained on the dataset ImageNet. ResNet50 is a Residual Network with 50 layers. Architecture of such Residual Network is notably explained in the document "K. He, X. Zhang, S. Ren and J. Sun, Deep Residual Learning for Image Recognition, 2016 IEEE Conference on Computer Vision and Pattern Recognition (CVPR), Las Vegas, NV, 2016, pp. 770-778, doi: 10.1109/CVPR.2016.90."

The last global pooling layer of said Resnet50 network was removed. By doing so, the model outputs a 7×7 grid for a 224×224 input image, rather than a conventional single output, thus producing finer whole slide image segmentation. Each output case from the 7×7 output grid represents the probability of tumour from its corresponding 32×32 input region.

At each iteration of the training process, several slides were retrieved in a batch. For each of the retrieved slides, 80 random tiles were randomly and uniformly sampled.

Each tile was data augmented at each iteration of each epoch. The data augmentation included random cropping from the initial 512 pixel-width tile to 224 pixels, color jitter with brightness, saturation, and contrast values of 0.1, and hue value of 0.01, and normalization with channelwise means of (0.6387467, 0.51136744, 0.6061169), and standard deviation of (0.31200314, 0.3260718, 0.30386254).

Then, each data augmented tile was forwarded through the Resnet50 network, thus outputting 7×7=49 probabilities per input tile. For each slide image, the resulting 80×49 probabilities were processed as described before.

In details, the associated prior computed percentage of tumour tissue p was sampled. Then, p % of the highest 80×49 probabilities were selected and assigned a ground-truth value of 1. The remaining 100−p % of lowest probabilities were assigned a ground-truth of 0. The selection of the p % highest and lowest values were performed by the function torch.topk of the pytorch package and by using different arguments of said function.

Then, an element-wise binary cross-entropy function (cost function) was computed for each output probability associated with its thus computed ground-truth. These error or cost values were then averaged across all output values and across all sampled slides from a batch, obtaining a signal which was further used to update the weights of the Resnet50 model using the Adam optimizer with betas of 0.9 and 0.999, learning rate of 5·10-4, and weight decay of 1·10-6.

The training experiments ran for 2000 epochs on 1 V100 graphic card.

After training, the model was inferred on 135 additional slides that were priorly left out for validation. To extract meaningful measures, pathologists manually delineated tumour regions in each validation slide. The trained model was asked to produce automatic and exhaustive tumour segmentation in each validation slide.

The following pixel-wise measures were then computed on all 135 validations slides using both trained model's outputs and the pathologists annotations.

The model achieved an AUC (Area Under Curve) of 0.938, a balanced accuracy of 0.918 using a threshold of 0.5, with a sensitivity of 0.954 and a specificity of 0.886.

These results demonstrate the good performance of the hereby method and device. Indeed, comparisons with state-of-the-art weakly supervised methods were performed.

Specifically, the same architecture with the same data pre-processing and data augmentation was trained using methods for training segmentation models with binary whole slide image labels. These labels are either 0 if there is no apparent tumour tissue within the slide, or 1 if there is at least some tumour tissue within the whole slide image. Then, standard multiple instance learning (MIL) methods were used to output trained segmentation models. These models were then graded on the same validation set with the expert annotations.

The best achieved performance in each measure was an AUC of 0.804, a balanced accuracy of 0.786, a precision of 0.826 and a specificity of 0.764.

The invention claimed is:

1. A method implemented by computer means for training a decision system for segmenting medical images from a training set of annotated medical images, said segments belonging to at least one class, each annotation of said medical images including quantitative information about a number of pixels of the image that belongs to each of said classes, said method comprising, for at least a part of the images of the training set, the following iterative steps:
   (a) dividing an image of said part of the training set into a set of sub-images or deriving features from said image, so as to obtain image instances,
   (b) predicting, using the decision system, for each pixel of at least part of said sub-images or for each image feature, the probability that said pixel or said feature belongs to each of the above classes, the prediction from the decision system being in the form of a prediction tensor,
   (c) calculating, from the prediction tensor, a pseudo ground-truth tensor using a pseudo ground-truth generator, said pseudo ground-truth generator assigning, for each instance and for each of said classes, a single probability value to at least part of the pixels or features having the highest probability of belonging to the concerned class, the number of pixels to which the high probability value is assigned being dependent on said quantitative information of the annotation, (d) calculating, for each instance, the result of a cost function based on the prediction tensor and the pseudo ground-truth tensor, and (e) updating the parameters of the decision system based on the result of the cost function, said method further comprising a final step of outputting a pre-trained model with updated parameters.

2. The method according to claim 1, wherein step consists in calculating, from the prediction tensor, a pseudo ground-truth tensor using a pseudo ground-truth generator, said pseudo ground-truth generator assigning, for each instance and for each of said classes, a single high probability value to at least part of the pixels or features having the highest probability of belonging to the concerned class and a single low probability value to at least part of the other pixels or features, the number of pixels to which the high probability value is assigned being dependent on said quantitative information of the annotation.

3. The method according to claim 2, wherein the single high value is a probability value equal to 1, the single low value being a probability value equal to 0.

4. The method according to claim 1, wherein each image of the training set is randomly divided into a set of sub-images.

5. The method according to claim 1, wherein a mask is applied to at least one image of the training set, discarding a part of said image from being divided into sub-images.

6. The method according to claim 1, wherein the decision system implement non-linear decisions algorithms, such as neural networks, including convolutional neural network or transformer-based algorithm.

7. A computer software, comprising instructions to implement at least a part of the method according to claim 1 when the software is executed by a processor.

8. A computer device comprising:
    an input interface to receive a training set of annotated medical images,
    a memory for storing at least instructions of a computer program comprising instructions to implement at least a part of the method according to claim 1,
    a processor accessing to the memory for reading the aforesaid instructions and executing then the method, and
    an output interface to provide the pre-trained model with updated parameters.

9. A computer-readable non-transient recording medium on which a computer software is registered to implement the method according to claim 1, when the computer software is executed by a processor.

\* \* \* \* \*